(12) United States Patent
Cho et al.

(10) Patent No.: US 7,406,127 B2
(45) Date of Patent: Jul. 29, 2008

(54) BOUNDARY TRACKING APPARATUS AND RELATED METHOD OF OFDM SYSTEM

(75) Inventors: Chun-Ming Cho, Chi-Lung (TW); Kuang-Yu Yen, Tai-Chung (TW)

(73) Assignee: Realtek Semiconductor Corp., HsinChu (TW)

( * ) Notice: Subject to any disclaimer, the term of this patent is extended or adjusted under 35 U.S.C. 154(b) by 653 days.

(21) Appl. No.: 10/908,979

(22) Filed: Jun. 2, 2005

(65) Prior Publication Data

US 2005/0271151 A1 Dec. 8, 2005

(30) Foreign Application Priority Data

Jun. 8, 2004 (TW) .............................. 93116426 A

(51) Int. Cl.
*H04K 1/10* (2006.01)
(52) U.S. Cl. ...................................... 375/260; 375/348
(58) Field of Classification Search ................. 375/260, 375/267, 285, 340, 342–343, 348, 350; 370/208, 370/210, 509, 512, 514, 520
See application file for complete search history.

(56) References Cited

U.S. PATENT DOCUMENTS

| 6,967,994 | B2* | 11/2005 | Boer et al. | 375/219 |
| 7,203,245 | B1* | 4/2007 | Murphy | 375/260 |
| 7,251,282 | B2* | 7/2007 | Maltsev et al. | 375/260 |
| 2002/0065047 | A1* | 5/2002 | Moose | 455/63 |
| 2004/0170237 | A1* | 9/2004 | Chadha et al. | 375/343 |
| 2005/0008088 | A1* | 1/2005 | Liu et al. | 375/260 |

* cited by examiner

*Primary Examiner*—Khanh C Tran
(74) *Attorney, Agent, or Firm*—Winston Hsu

(57) ABSTRACT

A boundary tracking method applied in an OFDM receiver includes generating a plurality of demodulated signal sets corresponding to part of sub-carriers of a packet according to different boundaries with different positions located at the packet, determining the most precise one of the boundaries according to a plurality of inter-symbol interference (ISI) values according to the demodulated signal sets, and calibrating a timing of a currently utilized boundary.

24 Claims, 5 Drawing Sheets

BOUNDARY TRACKING APPARATUS AND RELATED METHOD OF OFDM SYSTEM

BACKGROUND OF THE INVENTION

1. Field of the Invention

The invention relates to a boundary tracking apparatus, and more particularly, to a boundary tracking apparatus in an orthogonal frequency division multiplexing (OFDM) system and a method thereof.

2. Description of the Prior Art

Please refer to FIG. 1. FIG. 1 is a block diagram of a typical orthogonal frequency division multiplexing (OFDM) frame. According to the IEEE 802.11 a standard, the frames of the OFDM system have a short preamble in the beginning, a long preamble following afterwards, and a guard interval GI2 between the short preamble and the long preamble. There are also guard intervals GI between each data block to avoid the inter-symbol interference (ISI). The guard interval GI and GI2 can be a cyclic prefix of a data block or a cyclic prefix of the long preamble.

In conventional boundary detecting methods, a receiver detects the beginning of the long preamble and the beginning of the data blocks according to a period and the auto-correlation of the short preamble. The guard intervals GI are then removed accordingly to plan a boundary of the data blocks for fast Fourier transforming (FFT). Next, the conventional boundary detecting methods execute a fast Fourier transform on each data block according to the estimated channel responses of all the sub-carriers with different boundaries to determine a proper boundary.

However, the above-mentioned method usually mistakenly estimates the guard interval of the long preamble with a serious delay spread. Therefore, the above-mentioned methods choose a wrong timing to execute the fast Fourier transform. Furthermore, the prior boundary tracking methods are inefficient to compute for several times the FFT of numerous symbols according to every sub-carrier. That is, tracking the boundary by comparing the FFT of each symbol takes a lot of effort.

SUMMARY OF THE INVENTION

It is therefore one objective of the claimed invention to provide a boundary tracking apparatus for reducing the ISI in an OFDM system with less effort than the conventional boundary tracking apparatuses.

According to an embodiment of the claimed invention, a boundary tracking apparatus of an OFDM receiver is disclosed. The OFDM receiver receives at least one of data blocks corresponding to a plurality of sub-carriers according to a current timing boundary, the plurality of sub-carriers comprises a plurality of pilot sub-carriers and a plurality of data sub-carriers. The boundary tracking apparatus comprises: a first data acquisition module for receiving at least one of the data blocks according to a first timing boundary, and generating a first decoded data set according to a plurality of specific sub-carriers, wherein the plurality of specific sub-carriers are a part of the plurality of sub-carriers; a second data acquisition module for receiving at least one of the data blocks according to a second timing boundary distinct from the first timing boundary, and generating a second decoded data set according to the plurality of specific sub-carriers; an interference detecting module coupled to the first and the second data acquisition modules for respectively generating a first inter-symbol interference and a second inter-symbol interference according to the first decoded data set and the second decoded data set; and a timing controller for adjusting the current timing boundary according to the first and second inter-symbol interferences.

According to an embodiment of the claimed invention, a boundary tracking method of an OFDM receiver. The boundary tracking method of an OFDM receiver receives at least one of data blocks corresponding to a plurality of sub-carriers according to a current timing boundary, and the sub-carriers comprises a plurality of pilot sub-carriers and a plurality of data sub-carriers. The boundary tracking method comprises: receiving at least one of the data blocks according to a first timing boundary, and generating a first decoded data set according to a plurality of specific sub-carriers, wherein the plurality of specific sub-carriers are a part of the plurality of sub-carriers; receiving at least one of the data blocks according to a second timing boundary distinct from the first timing boundary, and generating a second decoded data set according to the plurality of specific sub-carriers; respectively generating a first inter-symbol interference and a second inter-symbol interference according to the first decoded data set and the second decoded data set; and adjusting the current timing boundary according to the first inter-symbol interference and the second inter-symbol interference.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
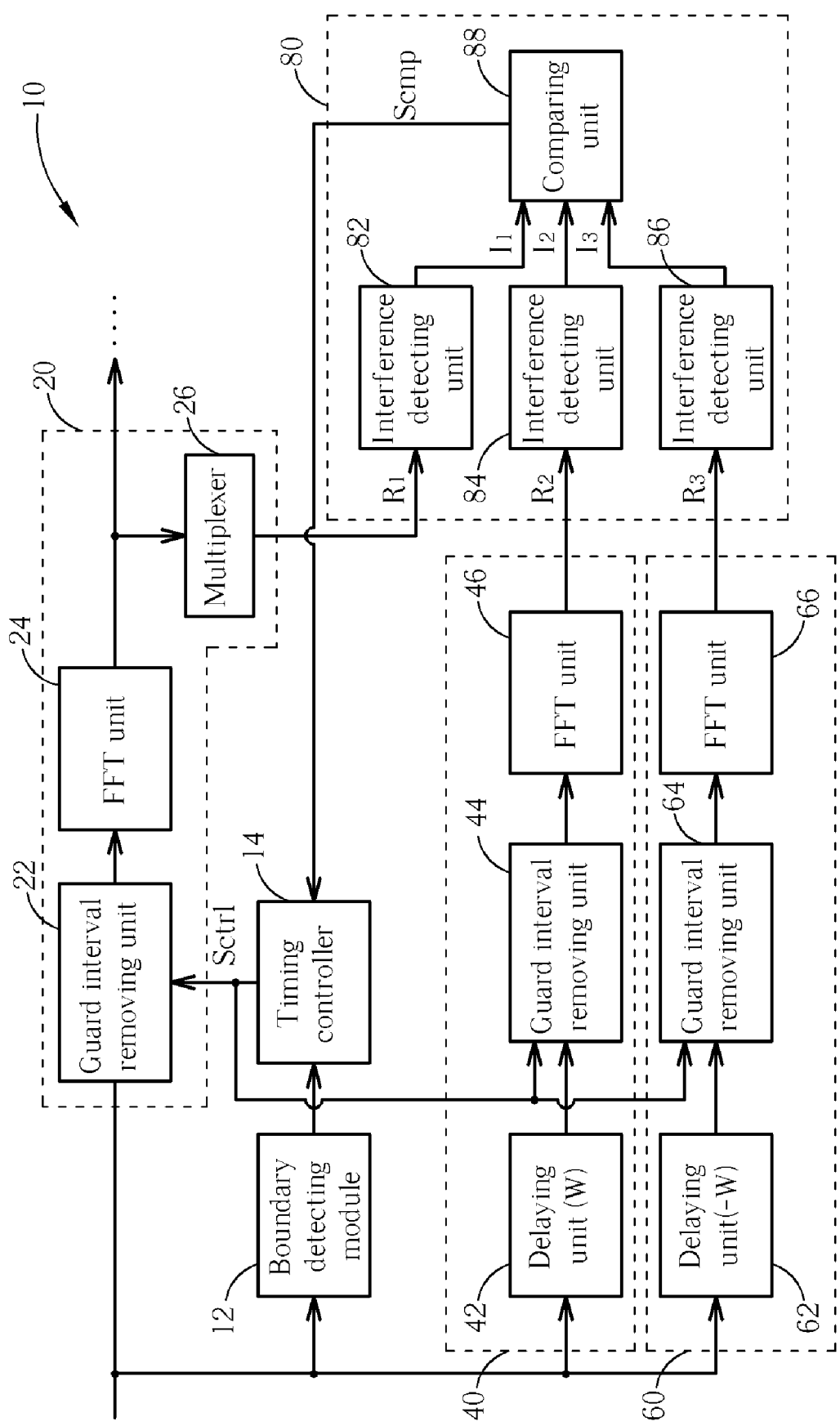
FIG. 2 is a functional block diagram of a first embodiment of a boundary tracking apparatus for an OFDM receiver according to the present invention.

Please refer to FIG. 2 showing a functional block diagram of a first embodiment of a boundary tracking apparatus 10 applied in an OFDM receiver according to the present invention. It is well-known that each data block includes numerous pilot codes transmitted respectively via the pilot sub-carriers and numerous data codes transmitted respectively via the data sub-carriers, where the pilot codes of each data block corresponding to the same sub-carrier have the same characteristic. The boundary tracking apparatus 10 therefore estimates the magnitude of the Inter Symbol Interference (ISI) by comparing the pilot codes of two adjacent data blocks and adjusts the timing boundary of Fast Fourier transform (FFT) according to the comparing result. In the present embodiment, the boundary tracking apparatus 10 includes a boundary detecting module 12, a timing controller 14, data acquisition modules 20, 40, 60, and interference detecting module 80.

The boundary detecting module 12 detects the boundary of data blocks. According to the detected boundary, the timing controller 14 outputs a control signal $S_{ctrl}$ to control the data acquisition modules 20, 40, 60. Finally, the interference detecting module 80 outputs a comparing signal $S_{cmp}$ to the timing controller 14 in order to adjust the boundary used by the data acquisition modules 20, 40 and 60. The data acquisition modules 20, 40, 60 respectively demodulate a received packet according to different boundaries in order to generate the decoded data sets $R_1$, $R_2$, $R_3$ for computing the related inter-symbol interferences $I_1$, $I_2$, $I_3$. The interference detecting module 80 therefore computes the inter-symbol interferences $I_1$, $I_2$, $I_3$ according to the decoded data sets $R_1$, $R_2$, $R_3$, and outputs the comparing signal $S_{cmp}$ related to the comparing result of the inter-symbol interference $I_1$, $I_2$, $I_3$.

The data acquisition module 20 includes a guard interval removing unit 22, an FFT unit 24, and a multiplexer 26. The guard interval removing unit 22 generates a timing boundary by determining the boundary of data blocks according to the control signal $S_{ctrl}$, and removes the guard interval GI according to the boundary of data blocks, and then gathers the output data in the data block. In the present embodiment, the FFT unit 24 generates a plurality of decoded data by executing fast Fourier transform on the data block according to each sub-carrier. Then the multiplexer 26 gathers some specific decoded data from the plurality of decoded data, and outputs those specific decoded data as a decoded data set $R_1$. In other words, the decoded data set $R_1$ is only a part of the numerous of decoded data, and the specific decoded data corresponds to a plurality of predetermined sub-carriers in the present embodiment.

The data acquisition module 40 includes a delaying unit 42, a guard interval removing unit 44, and an FFT unit 46. The delaying unit 42 is used for delaying the received packet with a predetermined time W. As a result, the timing boundary corresponding to the guard interval removing unit 44 exceeds the timing boundary corresponding to the data acquisition module 20. Please note that the delaying or exceeding relates to the starting position on the received packet in the present invention. The operation of the guard interval removing unit 44 is the same with the guard interval removing unit 22, and a repeated detailed description of the guard interval removing unit 44 is therefore abbreviated. However, the FFT unit 46 generates a plurality of decoded data by transforming the data block according to the specific sub-carriers, instead of generating the decoded data according to all of the sub-carriers.

The data acquisition module 60 and the data acquisition module 40 have the same functions with the same name. The difference between is that the delaying unit 62 advances the received packet with a predetermined time W. As a result, the timing boundary used by the data acquisition module 60 lags behind the timing boundary used by the data acquisition module 20. The data acquisition module 60 outputs the decoded data set R3 by generating the FFT of the data block according to the specific sub-carriers. Please note that, the predetermined time W can be a fixed value or a dynamically adjustable value based on the inter-symbol interference or the environment.

In the present embodiment, the interference detecting module 80 includes three interference detecting units 82, 84, 86 and a comparing unit 88. The interference detecting units 82, 84, 86 compute respectively the inter-symbol interferences $I_1$, $I_2$, $I_3$ according to the decoded data set $R_1$, $R_2$, $R_3$, wherein the inter-symbol interferences $I_1$, $I_2$, $I_3$ is related to remaining, delaying, and advancing the received packet. Finally, the comparing unit 88 chooses the smallest of the inter-symbol interferences $I_1$, $I_2$, $I_3$ and outputs a comparing signal $S_{cmp}$ to the timing controller 14 according to the smallest inter-symbol interference in order to adjust the currently used timing boundary.

For example, assume the OFDM system has 16 sub-carriers, wherein 4 sub-carriers are pilot sub-carriers (i.e., the specific sub-carriers mentioned above) presented as $$e^{+j\frac{2\pi n \cdot 0}{16}}, e^{+j\frac{2\pi n \cdot 4}{16}}, e^{+j\frac{2\pi n \cdot 8}{16}}, e^{+j\frac{2\pi n \cdot 12}{16}}.$$

Figure 1:
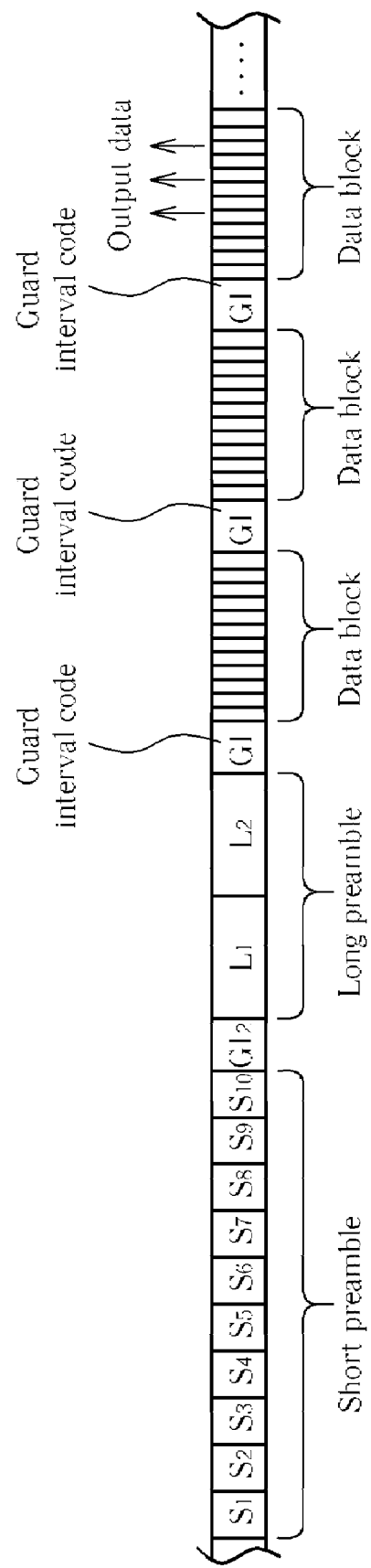
FIG. 1 is a schematic diagram of a typical OFDM frame.

According to the formula of fast Fourier transform $$X[k] = \sum_{n=0}^{N-1} x[n]e^{-j\frac{2\pi nk}{16}},$$

the decoded data $X[0]$, $X[4]$, $X[8]$, $X[12]$ corresponding to the 4 pilot sub-carriers are shown as below:

$$X[0] = (x[0] + x[2] + \ldots + x[15])e^{-j\frac{2\pi \cdot 0}{16}}$$

$$X[4] =$$
$$(x[0] + x[4] + x[8] + x[12])e^{-j\frac{2\pi \cdot 0}{16}} + (x[1] + x[5] + x[9] + x[13])e^{-j\frac{2\pi \cdot 4}{16}} +$$
$$(x[2] + x[6] + x[10] + x[14])e^{-j\frac{2\pi \cdot 8}{16}} +$$
$$(x[3] + x[7] + x[11] + x[15])e^{-j\frac{2\pi \cdot 12}{16}}$$

$$X[8] = (x[0] + x[2] + \ldots + x[14])e^{-j\frac{2\pi \cdot 0}{16}} +$$
$$(x[1] + x[3] + \ldots + x[15])e^{-j\frac{2\pi \cdot 8}{16}}$$

$$X[12] = (x[0] + x[4] + x[8] + x[12])e^{-j\frac{2\pi \cdot 0}{16}} +$$
$$(x[3] + x[7] + x[11] + x[15])e^{-j\frac{2\pi \cdot 4}{16}} +$$
$$(x[2] + x[6] + x[10] + x[14])e^{-j\frac{2\pi \cdot 8}{16}} + (x[1] + x[5] + x[9] + x[13])e^{-j\frac{2\pi \cdot 12}{16}}$$

wherein the data $x[0] \ldots x[15]$ are the output data shown in FIG. 1. The mentioned equation can be implemented by summing the output of a four-tap matching filter. The FFT unit 46 and 66 can therefore be implemented by four matching filters instead of 16 matching filters (i.e., center frequency are $$\left( \text{i.e., center frequency are } e^{+j\frac{2\pi n \cdot 0}{16}}, e^{+j\frac{2\pi n \cdot 1}{16}} \ldots e^{+j\frac{2\pi n \cdot 15}{16}} \right).$$

In summary, the apparatus of the present invention reduces the complexity of the FFT unit 46 and 66, and increases the efficiency of the FFT unit 46 and 66.

The present embodiment involves utilizing the FFT unit 24 to generate a plurality of decoded data according to all of the sub-carriers. However, the FFT unit 24 can only generate a few of decoded data according to the specific sub-carriers.

Figure 3:
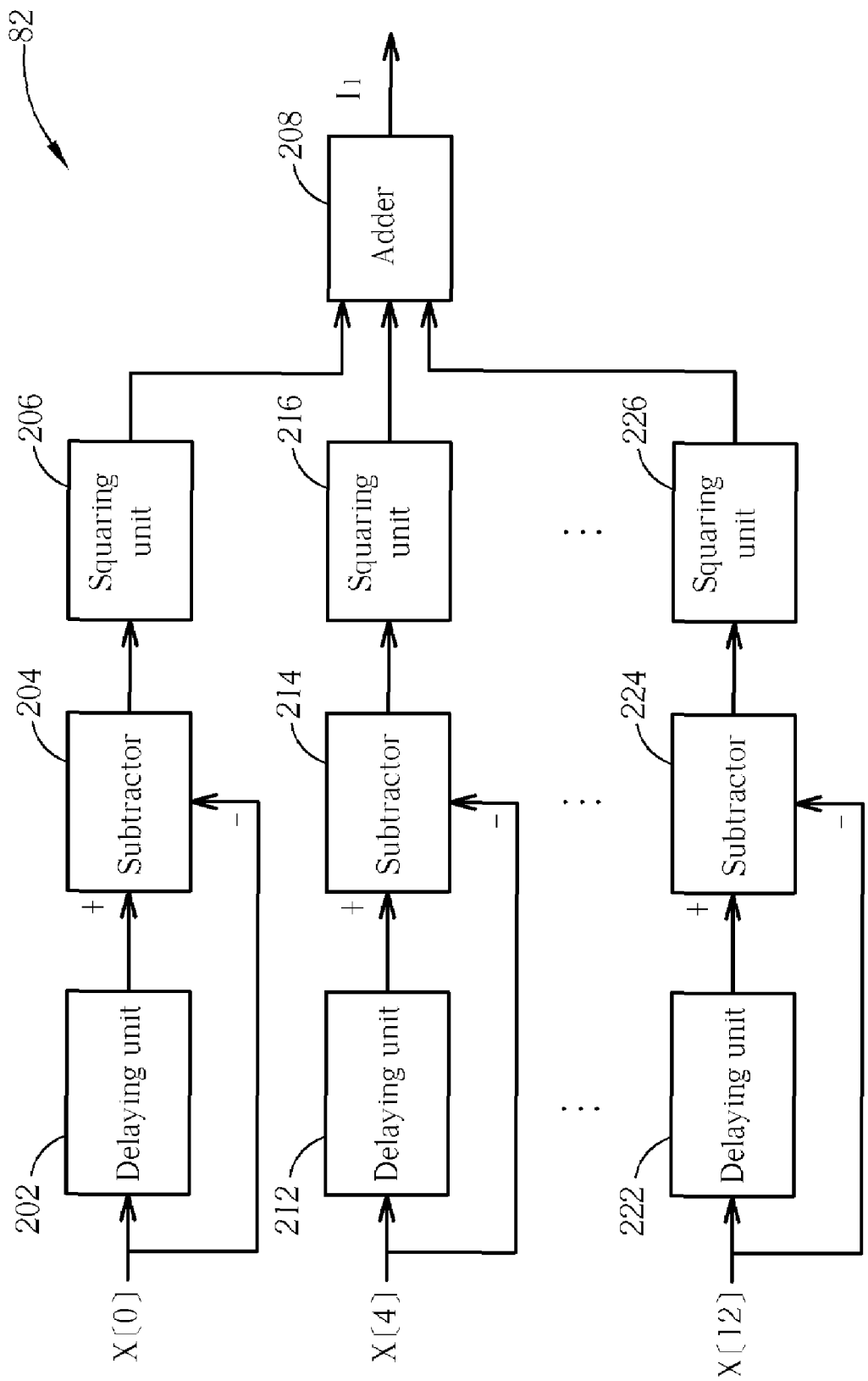
FIG. 3 is a schematic diagram of the interference detecting unit shown in FIG. 2.

Please refer to FIG. 3, which is a schematic diagram of the interference detecting unit 82 shown in FIG. 2. Please note that the interference detecting units 82, 84, 86 have the same electrical structure, so a repeated description of the interference detecting units 84, 86 is omitted for abbreviation. The interference detecting unit 82 includes a plurality of delaying units 202, 212, 222, a plurality of subtractors 204, 214, 224, a plurality of squaring units 206, 216, 226, and an adder 208. The delaying units 202, 212, 222 are used to delay the decoded data set $R_1$ for a sampling time. In the present embodiment, the decoded data set $R_1$ includes decoded data $X[0]$, $X[4]$, $X[8]$, $X[12]$. As a result, the delaying units 202, 212, 222 are used to delay the decoded data $X[0]$, $X[4]$, $X[8]$, $X[12]$ for a sampling time. The subtractors 204, 214, 224 subtract the current decoded data from the delayed decoded data, meaning that calculating the difference between a decoded signal in the previous data block and a decoded signal in the current data block transmitted via the same sub-carriers. Then, the squaring units 206, 216, 226 output the square values of the difference to adder 208, and the adder 208 sums all the square values to generate the inter-symbol interference $I_1$. Please note that the method of generating the inter-symbol interference by squaring the differences should not be construed as limiting the present invention. The present invention can also be applied to other applications, which generate the inter-symbol interference according to differences, such as summing the absolute values of the differences.

The difference value between the two decoded data corresponding to the same pilot sub-carrier should be zero if there is no inter-symbol interference. In other words, adopting an inappropriate boundary causes a greater difference indicating that worse inter-symbol interference occurs.

Finally, in order to adjust the timing boundary of data acquisition module 20, the comparing unit 88 generates a comparing signal $S_{cmp}$ to the timing controller 14 according to the minimum of the inter-symbol interferences 11, 12, 13.

Figure 4:
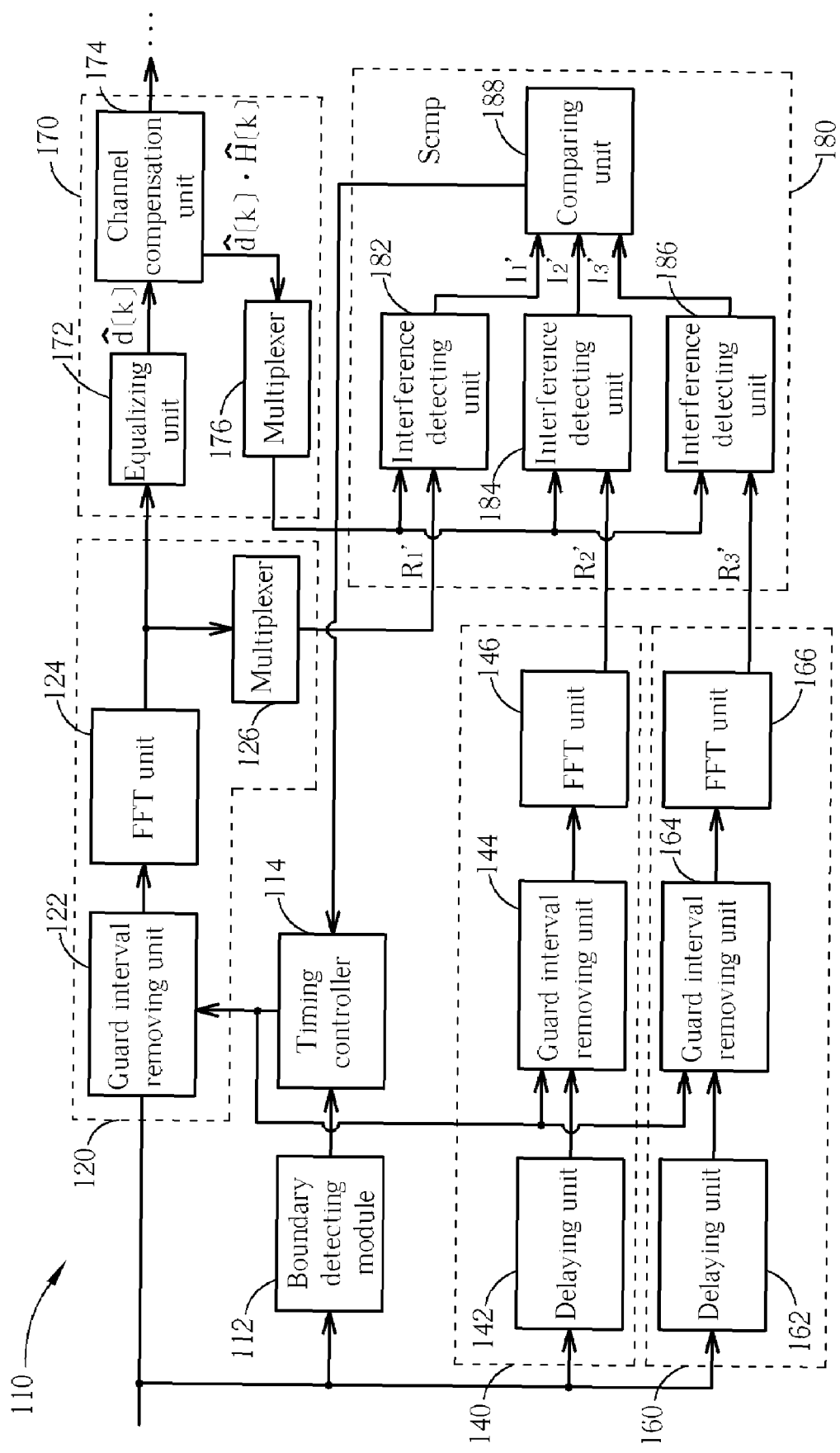
FIG. 4 is a functional block diagram of a second embodiment of the boundary tracking apparatus according to the present invention.

Please refer to FIG. 4, which is functional block diagram of a second embodiment of the boundary tracking apparatus 110 according to the present invention. In the present embodiment, the boundary tracking apparatus 110 is capable of using data sub-carriers to detect inter-symbol interference, wherein the function and structures of the boundary detecting module 112, the timing controller 114, and the data acquisition modules 120, 140, 160 are the same with the components having the same name in FIG. 2. Therefore, a repeated description of these components is omitted. Please note that the multiplexer 126 in the data acquisition module 120 gathers a plurality of decoded data corresponding to a plurality of specific data sub-carriers to generate the decoded data set $R_1'$, and the FFT units 146, 166 in the data acquisition modules 140, 160 execute the fast Fourier transform on the data blocks according to a plurality of specific data sub-carriers and output the decoded data set $R_2'$, $R_3'$.

In addition, the signal compensation module 170 includes an equalizing unit 172, a channel compensation unit 174, and a multiplexer 176. The compensation module 170 generates the estimated constellation signal $\hat{d}[k]$ according to a well-known decision-directed method, and generates the compensated data set ($\hat{d}[k] \cdot \hat{H}[k]$) according to the estimated channel response $\hat{H}[k]$ and the estimated constellation signal $\hat{d}[k]$. Finally, the multiplexer 176 gathers a part of the compensated data set, which corresponds to the plurality of specific data sub-carriers. As a result, all of the decoded data in the decoded data sets $R_1'$, $R_2'$, $R_3'$ corresponds to the plurality of specific data sub-carriers.

Figure 5:
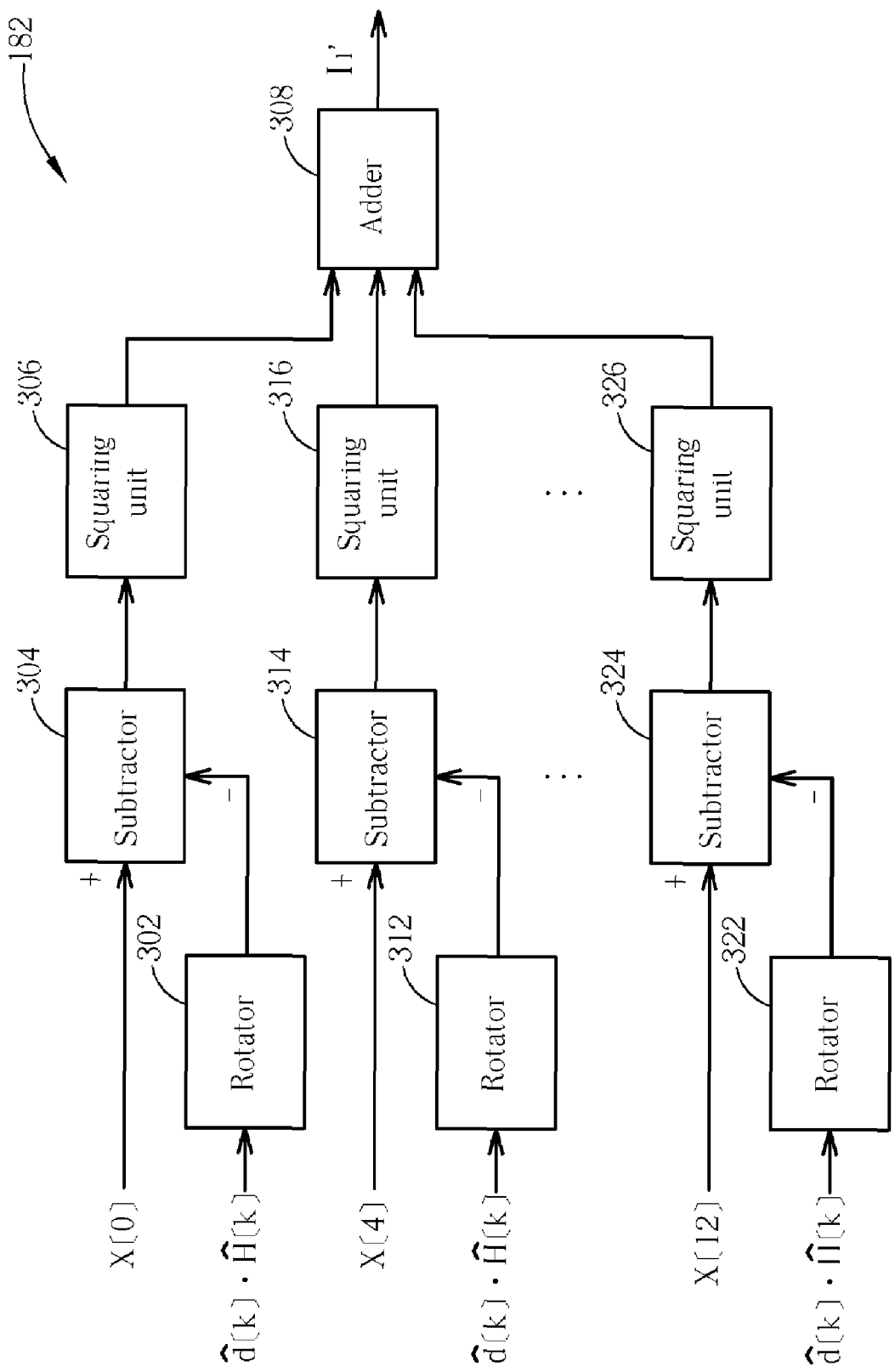
FIG. 5 is a functional block diagram of the interference detecting unit in FIG. 4.

Please refer to FIG. 5. FIG. 5 is a functional block diagram of the interference detecting unit 182 in FIG. 4. Please note that the interference detecting units 182, 184, 186 have the same electrical structure. Therefore, a repeated description of the interference detecting units 184, 186 is omitted. The interference detecting unit 182 includes subtractors 304, 314, 324, rotators 302, 312, 322, squaring units 306, 316, 326, and an adder 308. The rotators 302, 312, 322 rotate the compensated data set with a predetermined phase corresponding to a propagation timing delayed with a certain value. For example, if the propagation timing of the decoded data set $R_1'$ remains constant, the phase shift of the decoded data set $R_1'$ is zero, and if the propagation timing of the decoded data set $R_2'$ is delayed with a predetermined time W, the phase shift of the decoded data set $R_3'$ is $$e^{-j\frac{2\pi n k W}{M}},$$

and the propagation timing of the decoded data set $R_3'$ exceeds a predetermined time W, so the phase shift of the decoded data set $R_3'$ is $$e^{+j\frac{2\pi n k W}{M}}.$$

In the present embodiment, assume the OFDM has 16 sub-carriers, wherein 4 sub-carriers are data sub-carriers. The FFT units 146, 166 generate the decoded data set $R_2'$, $R_3'$ according to the 4 data sub-carriers $$e^{+j\frac{2\pi n \cdot 0}{16}}, e^{+j\frac{2\pi n \cdot 4}{16}}, e^{+j\frac{2\pi n \cdot 8}{16}}, e^{+j\frac{2\pi n \cdot 12}{16}}$$

(i.e., the specific sub-carriers mentioned above). However, the FFT unit 124 still generates the FFT of the data block according to all of the sub-carriers, and the multiplexer 126 selects decoded data set $R_1'$ from all of the decoded data. In other words, all of the decoded data sets $R_1'$, $R_2'$, $R_3'$ include the decoded data $X'[0], X'[4], X'[8], X'[12]$ corresponding to the same specific sub-carriers.

Because the compensated data set ($\hat{d}[k] \cdot \hat{H}[k]$) generated by the data acquisition module 120 is defined as the correct decoded data, the differences between the compensated data set and the decoded data sets $R_1'$, $R_2'$ and $R_3'$ are caused by the inter-symbol interference. The method of computing the inter-symbol interferences $I_1'$, $I_2'$, $I_3'$ according to the decoded data sets $R_1'$, $R_2'$, $R_3'$ is shown in the following equations:

$$I_1' = \sum_{n=1}^{L} \left| R_1'(n) - \hat{d}[k_n]\hat{H}[k_n] \right|^2, R_1'(0) = X'[0]$$

$$I_2' = \sum_{n=1}^{L} \left| R_2'(n) - \hat{d}[k_n]\hat{H}[k_n] \cdot e^{-j 2\pi k_n W/N} \right|^2$$

$$I_3' = \sum_{n=1}^{L} \left| R_3'(n) - \hat{d}[k_n]\hat{H}[k_n] \cdot e^{+j 2\pi k_n W/N} \right|^2$$

Finally, the comparing unit 188 generates a comparing signal $S_{cmp}$ to the timing controller 114 according to the minimum of the inter-symbol interferences $I_1'$, $I_2'$, $I_3'$ in order to adjust the timing boundary.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A boundary tracking apparatus of an OFDM (Orthogonal Frequency Division Multiplexing) receiver, the OFDM receiver receiving at least one of data blocks corresponding to a plurality of sub-carriers according to a current timing boundary, the plurality of sub-carriers comprising a plurality of pilot sub-carriers and a plurality of data sub-carriers, and the boundary tracking apparatus comprising:

a first data acquisition module for receiving at least one of the data blocks according to a first timing boundary, and generating a first decoded data set according to a plurality of specific sub-carriers, wherein the plurality of specific sub-carriers are a part of the plurality of sub-carriers;

a second data acquisition module for receiving at least one of the data blocks according to a second timing boundary distinct from the first timing boundary, and generating a second decoded data set according to the plurality of specific sub-carriers;

an interference detecting module coupled to the first and the second data acquisition modules for respectively generating a first inter-symbol interference and a second inter-symbol interference according to the first decoded data set and the second decoded data set; and a timing controller for adjusting the current timing boundary according to the first and second inter-symbol interferences.

2. The boundary tracking apparatus of claim 1, wherein the second timing boundary lags behind the first timing boundary.

3. The boundary tracking apparatus of claim 1, wherein the second timing boundary exceeds the first timing boundary.

4. The boundary tracking apparatus of claim 1, wherein each of the first and the second data acquisition modules comprises:
a guard interval removing unit for removing a guard interval of at least one of the data blocks; and
a fast Fourier transform (FFT) unit for transforming at least one of the data blocks according to the plurality of specific sub-carriers.

5. The boundary tracking apparatus of claim 4, wherein the first data acquisition module further comprises a delaying unit for delaying the data block in order to generate the second timing boundary by advancing the first timing boundary.

6. The boundary tracking apparatus of claim 4, wherein the second data acquisition module further comprises an advancing module for advancing the data block in order to generate the second timing boundary by delaying the first timing boundary.

7. The boundary tracking apparatus of claim 1, wherein the plurality of specific sub-carriers are a part of the pilot sub-carriers.

8. The boundary tracking apparatus of claim 7, wherein the interference detecting module comprises:
a first interference detecting unit for computing the first inter-symbol interference according to the first decoded data set;
a second interference detecting unit for computing the second inter-symbol interference according to the second decoded data set; and
a comparing unit coupling to the first and the second interference detecting units for comparing the first and the second inter-symbol interferences in order to output a comparing signal to the timing controller.

9. The boundary tracking apparatus of claim 8, wherein each of the first and second interference detecting units comprises:
at least one delaying unit for generating a first/second delayed decoded data set by delaying the first/second decoded data set; and
at least one interference computing unit for computing the first/second inter-symbol interference according to the first/second decoded data set and the first/second delayed decoded data set.

10. The boundary tracking apparatus of claim 9, wherein at least one of the interference computing units generates the first/second inter-symbol interference by summing a plurality of square values of the difference between the first/second decoded data set and the first/second delayed decoded data set.

11. The boundary tracking apparatus of claim 9, wherein at least one of the interference computing units generates the first/second inter-symbol interference by summing a plurality of absolute values of the difference between the first/second decoded data set and the first/second delayed decoded data set.

12. The boundary tracking apparatus of claim 9, wherein the first/second decoded data set corresponds to the data block, and the first/second delayed decoded data set corresponds to a specific data block next to the data block.

13. The boundary tracking apparatus of claim 1, wherein the plurality of specific sub-carriers are a part of the plurality of data sub-carriers.

14. The boundary tracking apparatus of claim 13, wherein the interference detecting module comprises:
a first interference detecting unit for computing the first inter-symbol interference according to the first decoded data set;
a second interference detecting unit for computing the second inter-symbol interference according to the second decoded data set; and
a comparing unit coupled to the first and the second interference detecting units for comparing the first and the second inter-symbol interferences in order to output a comparing signal to the timing controller.

15. The boundary tracking apparatus of claim 14, wherein the boundary tracking apparatus further comprises a signal compensation module for generating a compensated data set according to the characteristic of the plurality of specific sub-carriers, and the interference detecting module computes the first/second inter-symbol interference according to the first/second decoded data set and the compensated data set.

16. The boundary tracking apparatus of claim 15, wherein the signal compensation module generates the compensated data set utilizing a decision directed method.

17. The boundary tracking apparatus of claim 16, wherein the signal compensation module comprises:
an equalizing unit for generating an estimated constellation signal set by equalizing the first decoded data set;
a channel compensation unit for generating the compensated data set by compensating the estimated constellation signal set with an estimated channel response.

18. The boundary tracking apparatus of claim 15, wherein each of the first and the second interference detecting units comprises:
at least one rotator for generating a first rotated compensated data set and a second rotated compensated data set by rotating the compensated data set, wherein the first rotated compensated data set corresponds to the first timing boundary, and the second rotated compensated data set corresponds to the second timing boundary; and
at least one interference computing unit for computing the first/second inter-symbol interference according to the first/second decoded data set and the first/second rotated compensated data set.

19. The boundary tracking apparatus of claim 18, wherein at least one of the interference computing units generates the first/second inter-symbol interference by summarizing a plurality of square values of the difference between the first/second decoded data set and the first/second rotated compensated data set.

20. The boundary tracking apparatus of claim 18, wherein at least one of the interference computing units generates the first/second inter-symbol interference by summarizing a plurality of absolute values of the difference between the first/second decoded data set and the first/second rotated compensated data set.

21. A boundary tracking method of an OFDM receiver for receiving at least one of data blocks corresponding to a plurality of sub-carriers according to a current timing boundary, the sub-carriers comprising a plurality of pilot sub-carriers and a plurality of data sub-carriers, the boundary tracking method comprising:

receiving at least one of the data blocks according to a first timing boundary, and generating a first decoded data set according to a plurality of specific sub-carriers, wherein the plurality of specific sub-carriers are a part of the plurality of sub-carriers;

receiving at least one of the data blocks according to a second timing boundary distinct from the first timing boundary, and generating a second decoded data set according to the plurality of specific sub-carriers;

respectively generating a first inter-symbol interference and a second inter-symbol interference according to the first decoded data set and the second decoded data set; and adjusting the current timing boundary according to the first inter-symbol interference and the second inter-symbol interference.

22. The boundary tracking method of claim 21, wherein the step of decoding the data blocks comprises:

removing a guard interval of at least one of the data blocks; and executing a fast Fourier transform (FFT) on at least one data block according to the plurality of specific sub-carriers.

23. The boundary tracking method of claim 21, wherein the plurality of specific sub-carriers are a part of the pilot sub-carriers.

24. The boundary tracking method of claim 21, wherein the plurality of specific sub-carriers are a part of the plurality of data sub-carriers.

* * * * *